Figure 1:
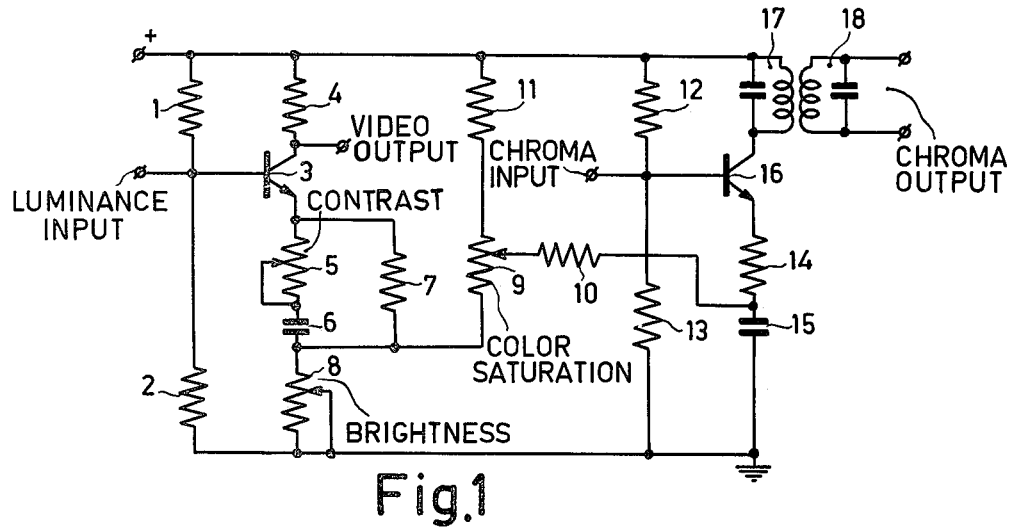

United States Patent [19]
Grewe

[11] 3,953,883
[45] Apr. 27, 1976

[54] COMBINED BRIGHTNESS CONTRAST AND COLOR SATURATION CONTROL CIRCUIT

[75] Inventor: Gunter Paul Grewe, Don Mills, Canada

[73] Assignee: U.S. Philips Corporation, New York, N.Y.

[22] Filed: Dec. 10, 1974

[21] Appl. No.: 531,331

[30] Foreign Application Priority Data
Feb. 11, 1974  Canada ............................ 192182

[52] U.S. Cl. .................................. 358/27; 358/39; 358/40
[51] Int. Cl.² ........................................ H04N 9/537
[58] Field of Search ................... 358/21, 27, 39, 40

[56] References Cited
UNITED STATES PATENTS
3,578,900  5/1971  Willis .................................... 358/39
3,715,463  2/1973  Matzek ................................. 358/39
3,814,852  6/1974  Mierzwinski ......................... 358/27

*Primary Examiner*—George H. Libman
*Attorney, Agent, or Firm*—Frank R. Trifari; Henry I. Steckler

[57] ABSTRACT

A color television receiver circuit for controlling independently contrast and color saturation and controlling simultaneously contrast, color saturation and average brightness. The brightness control establishes the working voltages for the video (contrast) and chrominance (saturation) amplifiers and the average current drawn by the color cathode ray tube (brightness).

4 Claims, 2 Drawing Figures

COMBINED BRIGHTNESS CONTRAST AND COLOR SATURATION CONTROL CIRCUIT

This invention relates to television reproducing apparatus and particularly to apparatus for reproducing television images in color.

The color television systems now in use are provided with manually operable controls to vary the overall brightness of the picture, the contrast and the saturation of the color picture being reproduced. In some cases the hue or tint of the picture can also be varied but this is of no concern for the present invention.

In the setting up or adjustment of a television receiver to reproduce a color picture it is usual to set the picture tube at a desired brightness, considering the ambient light, and to vary the contrast of the picture until the correct shading and/or black level is reached. Thereafter the color is inserted by means of a color saturation control and the level of color set to that which appears proper for the picture being reproduced.

If, however the ambient light varies to a large extent the overall picture color and brightness can then be either insufficient or too great and readjustment of the picture becomes necessary in the manner set forth above. Accordingly, it is desirable to provide means whereby a color television picture reproduction apparatus can be adjusted for proper brightness, contrast and color saturation for one ambient light condition and readjusted for other ambient light conditions by adjustment of only one control — i.e. the brightness control, without affecting the contrast and color saturation values with respect to the brightness value.

It is known to combine average brightness and picture contrast and this is generally accomplished by means of the luminance amplifier which is direct current connected to the cathode-ray picture reproduction tube (C.R.T.). The average direct current drawn by the video amplifier determines the average brightness of the reproduced picture and is controllable, for instance, by means of an adjustable series connected resistor so that adjustment of brightness inherently affects the gain of the luminance amplifier which determines the contrast value. The gain control of the luminance amplifier is generally in the form of a variable video frequency feedback resistor by-pass circuit so that adjustment of contrast does not affect average picture brightness.

Color saturation is adjusted independently by controlling the gain of the "chroma" or color amplifier.

Canadian Pat. No. 867,538 — SMEULERS — issued Mar. 30, 1971 shows a system wherein one control is used for adjustment of contrast and average brightness.

Canadian Pat. No. 848,079 — BEERS — issued July 28, 1970 shows mechanical systems for simultaneously adjusting brightness, contrast and color saturation. Clutch arrangements are used to vary one of the values with respect to the others and this is not entirely satisfactory. In addition it is difficult and costly to make such an arrangement automatic as, for instance, by the use of a light dependent resistor as is done in Canadian Pat. No. 710,457 — SUHRMANN — issued May 25, 1965 to control contrast and average brightness.

It is therefore an object of this invention to provide circuit means, in a color television picture reproduction apparatus, which provides for adjustment of contrast and color saturation of a reproduced color picture with respect to the brightness thereof and wherein the relative value of contrast and color saturation with respect to the brightness value are maintained when the brightness alone is adjusted.

According to the present invention a circuit is provided wherein the gain (contrast) of the luminance amplifier in a direct current connected video amplifier system as described above, is adjustable without changing the average direct current of the video amplifier and wherein the adjustment of the average brightness affects the gain of the video amplifier to maintain their relative values. The adjustment of brightness determines the overall voltage and negative feedback, of the video amplifier. In addition color saturation control is provided by selecting a voltage by means of a variable tap on a resistive bleeder network connected across the luminance amplifier.

Figure 2:
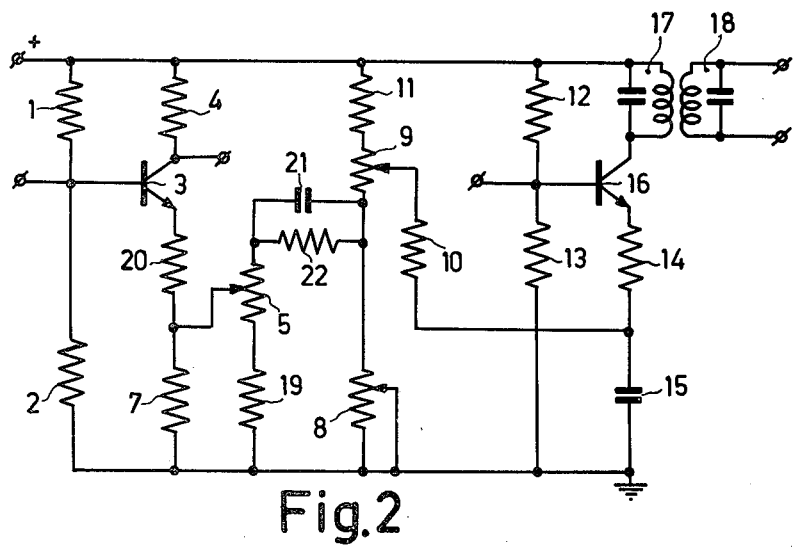

In order to more fully and clearly describe the present invention and advantages thereof reference will now be made to the attached figures of the drawing in which FIGS. 1 and 2 show two embodiments of the invention wherein like parts are similarly designated.

Referring now to FIG. 1 a luminance signal amplifying transistor 3 is shown having a conventional biasing arrangement comprising serially connected resistors 1, 2. A resistor 4 acts as the collector load for transistor 3 across which amplified luminance signals of a color television signal appear. The amplified luminance signals are supplied, for instance, to the cathodes of a color picture reproduction cathode-ray tube in the case wherein color matrixing is performed in the picture tube.

The emitter circuit of transistor 3 comprises a parallel arrangement of resistor 7 and serially connected variable resistor 5 and capacitor 6. Variable resistor 5 is the prime contrast control and varies the negative feedback, provided by the parallel arrangement, to transistor 3 as will be obvious. The end of the parallel arrangement 5, 6, 7, remote from the emitter of transistor 3, is connected to one end of a variable resistor 8 (brightness control) the other end of which is connected to a voltage reference point, in this case ground. The ungrounded end of variable resistor 8 is also connected through a potentiometer 9 and a resistor 11 to a voltage supply line marked +.

Also connected between the voltage supply line and ground is a chroma amplifier comprising a transistor 16 with a conventional bleeder bias arrangement consisting of resistors 12, 13. A broadly tuned collector load circuit for the chroma amplifier is comprised by output coupling transformer 17, 18. The emitter of transistor 16 is connected to reference potential through serially connected resistor 14 and capacitor 15. The common terminal of resistor 14 and capacitor 15 is connected through resistor 10 to the tap on potentiometer 9.

In the operation of this circuit brightness control 8 is used to adjust the total direct current flowing through the luminance and chroma amplifier as well as the negative feedback of the luminance amplifier. Contrast control variable resistor 5 controls the gain of the luminance amplifier as well since it also acts as a variable negative feedback control by adjusting the effectiveness of by-pass capacitor 6. Potentiometer 9 taps off a selected portion of the voltage between the supply line and variable resistor 8 and hence controls the operational bias and consequently the gain of the chroma amplifier.

It will now be obvious that variable resistor 5 separately controls the gain of the luminance amplifier, potentiometer 9 controls the bias and gain of the chroma amplifier and variable resistor 8 controls simultaneously the gain of the luminance and chroma amplifiers as well as the direct current flowing through the luminance amplifier which is directly connected to the C.R.T. for brightness control.

Referring now to the circuit of FIG. 2, which to a large extent is similar to that of FIG. 1, variable potentiometer 5 controls the negative feedback of the luminance amplifier and more importantly the proportion of the supply voltage bias tapped off a bleeder composed of resistor 11, potentiometer 9 and potentiometer 8. It will be obvious that the gain of the luminance amplifier is controlled in the first instance by potentiometer 5 and in the second instance by potentiometer 8 which also controls the direct current for the picture tube. Variation potentiometer 5 will also result in some brightness change with contrast. A current limiting resistor 22, connected between the tap of potentiometer 9 and one end of potentiometer 5, is by-passed by capacitor 21 so that this resistor is not a source of negative feedback for the luminance amplifier.

As in the case of the circuit shown in FIG. 1, potentiometer 9 taps off a selected portion of the voltage determined by the setting of brightness control potentiometer 8 for control of the chroma amplifier. Gain of the chroma amplifier will be dependent on the settings of potentiometers 8 and 9.

It will now be obvious that the circuit shown in FIG. 2 provides for substantially independent luminance and chroma control plus overall combined brightness, luminance and chroma control.

Other embodiments of the invention will now be apparent, to those skilled in the art, which do not depart from the spirit and scope of the invention as set forth in the appended claims.

What is claimed is:

1. A circuit for controlling substantially independently the gain of luminance and chroma amplifiers and simultaneously the gain of the luminance and chroma amplifiers and the average brightness of a color television picture reproducing apparatus, said circuit comprising a luminance amplifier means for directly coupling to and supplying direct current for a color television picture reproduction tube, said luminance amplifier having a common AC and DC feedback path means to control the gain of the luminance amplifier, an average brightness luminance and chrominance control means coupled to said path for controlling the supply of direct current voltage to the luminance amplifier, a chroma amplifier, and means to select a portion of the voltage supplied to the luminance amplifier to determine the operational bias of the chroma amplifier.

2. A circuit for controlling substantially independently the gain of luminance and chroma amplifiers and simultaneously the gain of the luminance and chroma amplifiers and the average brightness of a color television picture reproducing apparatus, said circuit comprising a luminance amplifier having an active transistor biased for normal operation, a load circuit means for directly coupling to a color picture reproduction tube, a DC and AC negative feedback biasing arrangement for the said transistor incorporating a variable feedback control, a supply voltage source, a bleeder network coupled across the supply voltage source including first and second potentiometers, said second potentiometer being part of said feedback biasing arrangement and comprising a brightness luminance and chrominance control, means for coupling the luminance amplifier between one terminal of the supply voltage and the common terminal for the first and second potentiometers, a chroma amplifier means for supplying color information to said reproduction tube, and means for coupling the tap of the first potentiometer to a bias control input of the chroma amplifier, the first potentiometer being coupled in parallel with at least a portion of the luminance amplifier including the said negative feedback biasing arrangement.

3. The circuit as claimed in claim 2 wherein the negative feedback biasing arrangement comprises a first resistor paralleled by the series arrangement of a serially connected variable resistor and a capacitor in the load path of the luminance amplifier.

4. The circuit as claimed in claim 2 wherein the negative feedback biasing arrangement comprises a third potentiometer connected in parallel with the said second potentiometer, the tap of the third potentiometer being connected to supply direct current control voltage to the said transistor.

* * * * *